(12) United States Patent
Mackey et al.

(10) Patent No.: US 9,179,110 B2
(45) Date of Patent: Nov. 3, 2015

(54) IMAGING SYSTEMS WITH MODIFIED CLEAR IMAGE PIXELS

(71) Applicant: Semiconductor Components Industries, LLC, Phoenix, AZ (US)

(72) Inventors: Jeffrey Mackey, Danville, CA (US); Gershon Rosenblum, Fremont, CA (US); Alexandre G. Dokoutchaev, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 118 days.

(21) Appl. No.: 13/951,211

(22) Filed: Jul. 25, 2013

(65) Prior Publication Data

US 2014/0125838 A1 May 8, 2014

Related U.S. Application Data

(60) Provisional application No. 61/722,093, filed on Nov. 2, 2012.

(51) Int. Cl.
*H04N 9/04* (2006.01)
*G02B 5/20* (2006.01)
*G02B 5/22* (2006.01)
*G06T 3/40* (2006.01)

(52) U.S. Cl.
CPC ............... *H04N 9/045* (2013.01); *G02B 5/201* (2013.01); *G02B 5/223* (2013.01); *G06T 3/4015* (2013.01)

(58) Field of Classification Search
None
See application file for complete search history.

(56) References Cited

U.S. PATENT DOCUMENTS

| | | | |
|---|---|---|---|
| 5,874,188 A * | 2/1999 | Roberts et al. | 430/7 |
| 7,525,587 B2 | 4/2009 | Bock | |
| 2002/0048709 A1* | 4/2002 | Machiguchi et al. | 430/7 |
| 2002/0140010 A1* | 10/2002 | Vu et al. | 257/294 |
| 2010/0194945 A1 | 8/2010 | Chiu et al. | |
| 2011/0001856 A1* | 1/2011 | Matsuoka | 348/294 |
| 2011/0063482 A1* | 3/2011 | Kim et al. | 348/273 |

OTHER PUBLICATIONS

Lim et al., "A High-Speed CMOS Image Sensor With Column-Parallel Tewo-Step Single-Slope ADCs", IEEE Transactions on Electron Devices, vol. 56, No. 3, Mar. 2009, pp. 393-398.

\* cited by examiner

*Primary Examiner* — Justin P Misleh
(74) *Attorney, Agent, or Firm* — Treyz Law Group; Michael H. Lyons

(57) ABSTRACT

An image sensor may have an array of image sensor pixels arranged in unit pixel cells each having at least one modified clear image pixel. Each modified clear image pixel may include a modified clear color filter element formed from a transparent material such as an oxide material that is modified with a colored pigment or colored dye such as yellow pigment. Each unit pixel cell may include one or more color pixels of other colors such as red pixels, blue pixels, and green pixels. Image signals such as yellow image signals from the modified clear pixels may be processed along with other color image signals such as red image signals and blue image signals to generate standard red, green, and blue image data. Image processing operations may include chroma demosaicing or point filtering of the image signals from the modified clear image pixels.

17 Claims, 7 Drawing Sheets

Y
30

MIXTURE OF TRANSPARENT MATERIAL AND
COLOR PIGMENT MATERIAL
INCLUDING AT LEAST 20 PERCENT
COLOR PIGMENT MATERIAL

PASSES GREEN LIGHT AND RED LIGHT AND
BLOCKS BLUE LIGHT

TRANSMITS MORE THAN 30 PERCENT OF LIGHT HAVING WAVELENGTHS BETWEEN 485 NM AND 800 NM WHILE TRANSMITTING LESS THAN THIRTY PERCENT OF LIGHT HAVING OTHER WAVELENGTHS

TRANSMITS MORE THAN 30 PERCENT OF LIGHT HAVING WAVELENGTHS BETWEEN 475 NM AND 800 NM WHILE TRANSMITTING LESS THAN THIRTY PERCENT OF LIGHT HAVING OTHER WAVELENGTHS

TRANSMITS MORE THAN 30 PERCENT OF LIGHT HAVING WAVELENGTHS BETWEEN 450 NM AND 800 NM WHILE TRANSMITTING LESS THAN THIRTY PERCENT OF LIGHT HAVING OTHER WAVELENGTHS

FIG. 4F

IMAGING SYSTEMS WITH MODIFIED CLEAR IMAGE PIXELS

This application claims the benefit of provisional patent application No. 61/722,093, filed Nov. 2, 2012, which is hereby incorporated by reference herein in its entirety.

BACKGROUND

This relates generally to imaging systems, and more particularly, to imaging systems with modified clear image pixels.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

Conventional imaging systems employ an image sensor in which the visible light spectrum is sampled by red, green, and blue (RGB) image pixels arranged in a Bayer mosaic pattern. The Bayer mosaic pattern consists of a repeating cell of two-by-two image pixels, with two green pixels diagonally opposite one another, along with a red pixel and a blue pixel that are diagonally opposite one another.

Some imaging systems replace the green color filters in the standard Bayer mosaic pattern by a non-absorbing clear material. This type of clear pixel can boost the sensor light sensitivity by a factor of more than two, thereby significantly improving the medium and low-light performance. However, this type of color scheme is partially subtractive and therefore can require the use of relatively high color correction coefficients. In addition, the high sensitivity of the clear pixel can result in a color channel imbalance that is typically corrected using relatively high white-balance coefficients. Thus, if care is not taken, proper color correction using these types of color correction and white-balance coefficients can result in an enhancement of pixel noise.

It would therefore be desirable to be able to provide improved imaging systems.

BRIEF DESCRIPTION OF THE DRAWINGS

FIGS. 4A-4F show diagrams of a portion of an illustrative image pixel array having unit pixel cells with modified clear pixels in accordance with an embodiment of the present invention.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
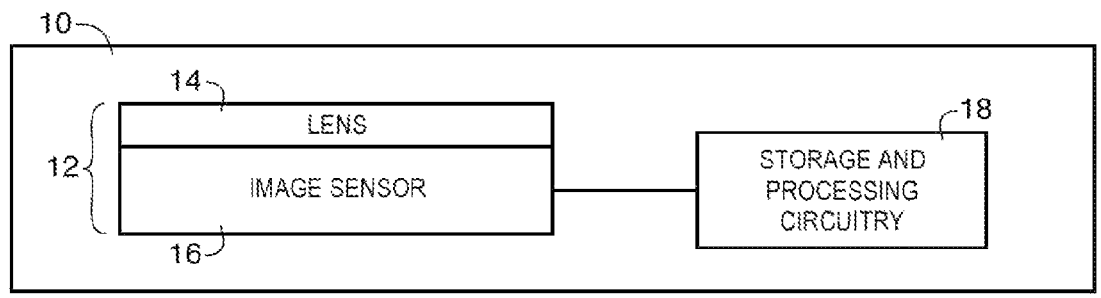
FIG. 1 is a diagram of an illustrative imaging system having an image sensor with modified clear pixels in accordance with an embodiment of the present invention.

FIG. 1 is a diagram of an illustrative imaging system having an image sensor for capturing images. System 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to processing circuitry such as storage and processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
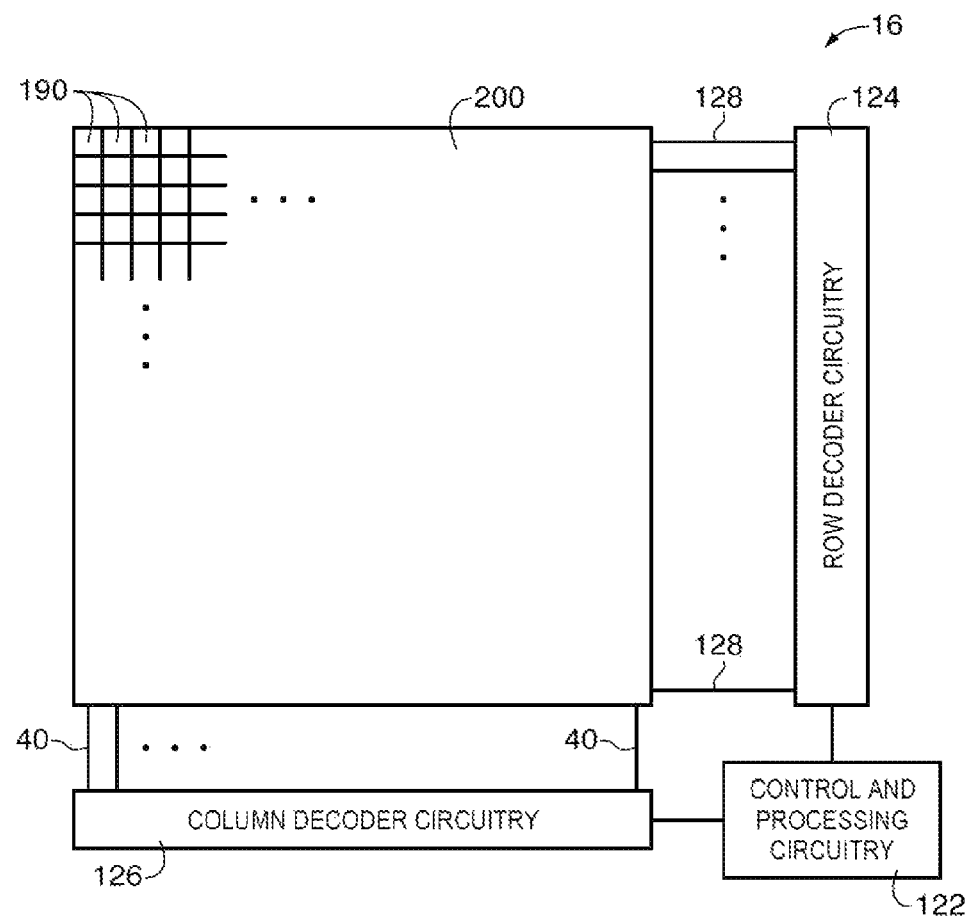
FIG. 2 is a diagram of an illustrative pixel array with modified clear pixels and associated control circuitry in accordance with an embodiment of the present invention.

As shown in FIG. 2, image sensor 16 may include an array of image pixels such as pixel array 200 containing image sensor pixels 190 (sometimes referred to herein as image pixels or pixels) and control and processing circuitry 122. Array 200 may contain, for example, hundreds or thousands of rows and columns of image sensor pixels 190. Control circuitry 122 may be coupled to row decoder circuitry 124 and column decoder circuitry 126. Row decoder circuitry 124 may receive row addresses from control circuitry 122 and supply corresponding row control signals such as reset, row-select, transfer, and read control signals to pixels 190 over control paths 128. One or more conductive lines such as column lines 40 may be coupled to each column of pixels 190 in array 200. Column lines 40 may be used for reading out image signals from pixels 190 and for supplying bias signals (e.g., bias currents or bias voltages) to pixels 190. During pixel readout operations, a pixel row in array 200 may be selected using row decoder circuitry 124 and image data associated with image pixels 190 in that pixel row can be read out along column lines 40.

Image pixels 190 may be complementary metal-oxide-semiconductor (CMOS) image pixels, charge-coupled-device (CCD) image pixels or may employ other types of imaging circuitry. As an example, CMOS image pixels may include a photosensitive element such as a photodiode, a positive power supply terminal, a ground power terminal, and transistors such as reset transistors, source follower transistors, transfer transistors, etc. Incoming light may be collected by a photosensitive element such as photodiode after passing through a color filter element. Charges generated on the photodiode in response to the incoming light may be transferred to a charge storage region such as a floating diffusion region implemented using a region of doped semiconductor (e.g., a doped silicon region formed in a silicon substrate by ion implantation, impurity diffusion, or other doping techniques). An image signal associated with the stored charge on can be conveyed along a column line to column circuitry such as column decoder circuitry 126.

Column decoder circuitry 126 may include sample-and-hold circuitry, amplifier circuitry, analog-to-digital conversion circuitry, bias circuitry, column memory, latch circuitry for selectively enabling or disabling the column circuitry, or other circuitry that is coupled to one or more columns of pixels in array 200 for operating pixels 190 and for reading out image signals from pixels 190. Readout circuitry such as signal processing circuitry associated with column decoder circuitry 126 (e.g., sample-and-hold circuitry and analog-to-digital conversion circuitry) may be used to supply digital image data to processor 18 (FIG. 1).

Image pixels 190 may include modified clear pixels. For example, some of pixels 190 may include color filter elements formed from transparent material with a color additive such as a yellow pigment or other similarly shaded pigment or dye. The pigment may be added to the transparent color filter element material in concentrations configured to give desired spectral filtration qualities to an otherwise uniformly transparent color filter array pixel. For example modified clear color filter elements for modified clear image pixels may include more than 25% color pigment material, more than 30% color pigment material, more than 80% color pigment material, more than 5% color pigment material, or other concentrations of color pigment material. This type of modified clear color filter element may be used in combination with any of a plurality of color scheme implementations. Pigment concentration can be modified as desired up to the maximum dissolved solid level necessary to maintain lithographic processing capability.

Figure 3:
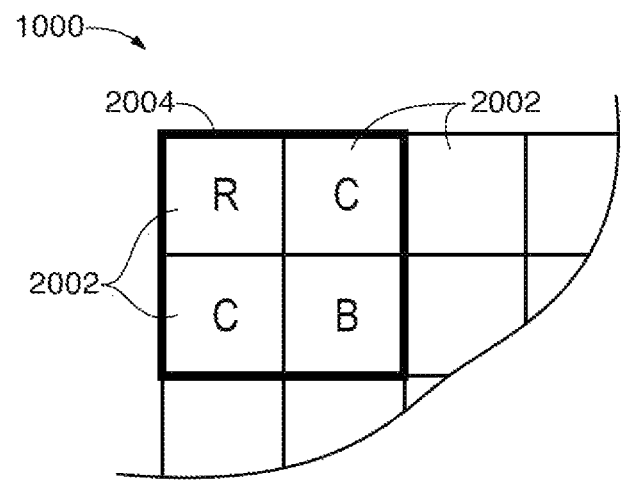
FIG. 3 is a diagram of a portion of a conventional image sensor having a pixel unit cell with two clear filter pixels, a red pixel and a blue pixel.

As shown in FIG. 3, conventional image sensors such as conventional image sensor 1000 contain unit pixel cells 2004 having image pixels 2002 that include two clear (C) image pixels that are diagonally opposite one another and adjacent to a red (R) image pixel that is diagonally opposite to a blue (B) image pixel. Clear image pixels 2002 in unit cell 2004 are formed with a visibly transparent color filter that transmits light across the visible light spectrum (e.g., clear pixels 2002 can capture white light). Clear image pixels 2002 may have a natural sensitivity defined by the material that forms the transparent color filter and/or the material that forms the image sensor pixel (e.g., silicon). It has been previously suggested that the sensitivity of clear image pixels 2002 may be adjusted for better color reproduction and/or noise characteristics through use of light absorbers such as pigments. However, prior to the present application, no details have been previously suggested as to the implementation of this type of solution. Unit cell 2004 is repeated across image pixel array 1000 to form a mosaic of red, clear, and blue image pixels 2002.

Figure 4A:
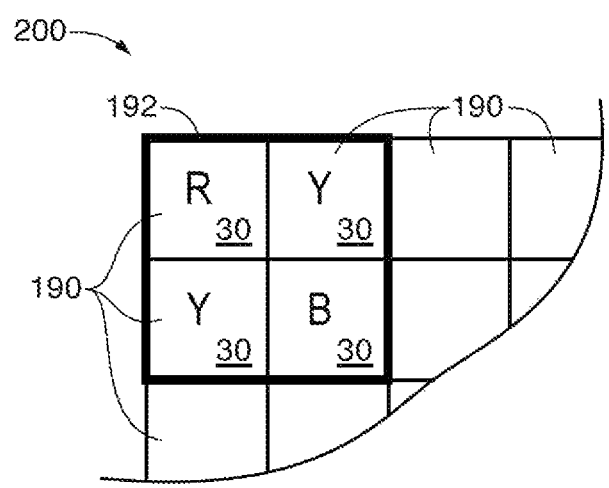

FIG. 4 shows a portion of image pixel array 200 having image pixels 190 with red (R) color filter elements 30, blue (B) color filter elements 30, and modified clear (Y) color filter elements 30 in which a pigment such as a yellow pigment has been added to clear color filter element material (e.g., transparent oxide material) to form modified clear pixels such as yellow pigment pixels.

As shown in FIG. 4, a unit cell 192 of image pixels 190 may be formed from two modified clear (Y) image pixels (e.g., yellow pigmented clear image pixels, orange pigmented clear image pixels, etc.) that are diagonally opposite one another and adjacent to a red (R) image pixel that is diagonally opposite to a blue (B) image pixel. Y image pixels 190 in unit cell 192 may be formed with a modified clear color filter element 30 that is formed from an oxide material with added pigment material such as yellow pigment material. Y color filter element 30 may transmit more than 30 percent of light having wavelengths between 485 nm and 800 nm, between 475 nm and 800 nm, between 450 nm and 800 nm, between 400 nm and 800 nm, or greater than 300 nm (as examples) while transmitting less than 30 percent of light having other wavelengths.

In one suitable example that is sometimes discussed herein as an example, yellow pigment in Y color filter element 30 may pass red light and green light while blocking some or all blue light. In this type of configuration, Y pixels 190 may have a sensitivity to low light that is comparable to completely clear pixels while preventing saturation by blue-heavy bright light.

Providing image pixel array 200 with modified clear pixels 190 may be beneficial in image pixel arrays with very small pixels in which the pixel size generates diffraction effects near the diffraction limit for red light. In this type of system, red light sensitivity can be lowered due light diffraction and low photodiode depth. Y pixels 190 that block some or all blue light can therefore help balance the natural skew toward blue light absorption of this type of small pixel.

Providing image pixel array 200 with modified clear (Y) pixels 190 may also reduce the sensor color performance sensitivity to production variations by reducing the total color error gains in comparison with completely clear pixels.

Unit cell 192 may be repeated across image pixel array 200 to form a mosaic of red, modified clear, and blue image pixels 190. Red image pixels may generate red image signals in response to red light, blue image pixels may generate blue image signals in response to blue light, and modified clear image pixels may generate yellow or orange (as examples) image signals in response to light that has passed through the modified clear (Y) color filter elements 30

The unit cell 192 of FIG. 4 is merely illustrative. If desired, unit pixel cells 192 may include one or more modified clear pixels and one or more pixels of any other suitable color. For example, unit cell 192 may include two modified clear (Y) image pixels 190 that are formed diagonally opposite one another and adjacent to a red image pixel that is diagonally opposite to a green (G) image pixel. In another suitable arrangement, unit cell 192 may include two modified clear (Y) image pixels 190 that are formed diagonally opposite one another and adjacent to a blue image pixel that is diagonally opposite to a green image pixel. In yet another suitable example, unit cell 192 may include a single modified clear (Y) image pixel 190, a red (R) image pixel 190, a green (G) image pixel 190, and a blue (B) image pixel 190.

Image signals generated by image pixels 190 in image pixel array 200 having modified clear (Y) image pixels may be converted to red, green, and blue image signals to be compatible with circuitry and software that is used to drive image displays (e.g., display screens, monitors, etc.). This conversion may involve white balance corrections and/or color corrections that include the modification of captured image signals using a color correction matrix (CCM).

If desired, circuitry such as processing circuitry 18 (see FIG. 1) may perform chroma de-noising operations on gathered image signals from image pixels 190 prior to applying the CCM to gathered image signals. Chroma de-noising may be performed by processing circuitry 18 (FIG. 1) by applying a chroma filter to image signals gathered by image pixels 190. The chroma filter may increase noise correlation between image signals from different colored image pixels (e.g., red, modified clear, and blue image signals). Increasing noise correlation between image signals from different colored image pixels may reduce noise amplification by the CCM, leading to improved final image quality.

If desired, chroma de-noiseing operations may be combined with a noise compensating operation such as a point filter operation applied to the captured image signals. The point filter operation may use high fidelity yellow image signals to enhance the quality of red, green, and/or blue image signals produced using the CCM. If desired, image sensor 16 may perform one or both of the chroma de-noising and the point filter operations to reduce noise amplification by the CCM to yield improved luminance performance in the final image.

Figure 5:
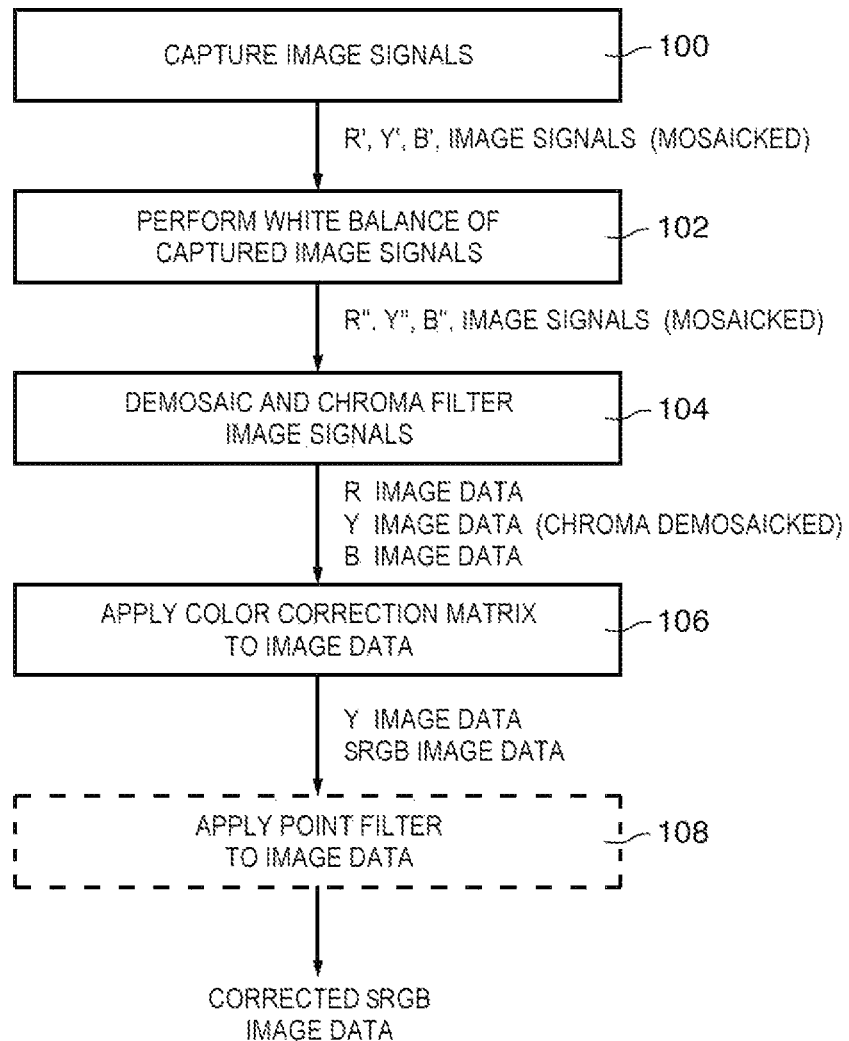
FIG. 5 is a flow chart of illustrative steps that may be performed by processing circuitry in an imaging system to process image signals received from an image pixel array having modified clear pixels in accordance with an embodiment of the present invention.

FIG. 5 is a flow chart of illustrative steps that may be performed by processing circuitry such as processing circuitry 18 of FIG. 1 to process image signals gathered by pixel array 200 (e.g., a pixel array having modified clear (Y) image pixels such as yellow pigmented image pixels and/or orange pigmented image pixels). The steps of FIG. 5 may, for example, be performed by processing circuitry 18 using image signals generated using unit cells having modified clear (Y) image pixels such as those shown in FIG. 4.

Figure 6:
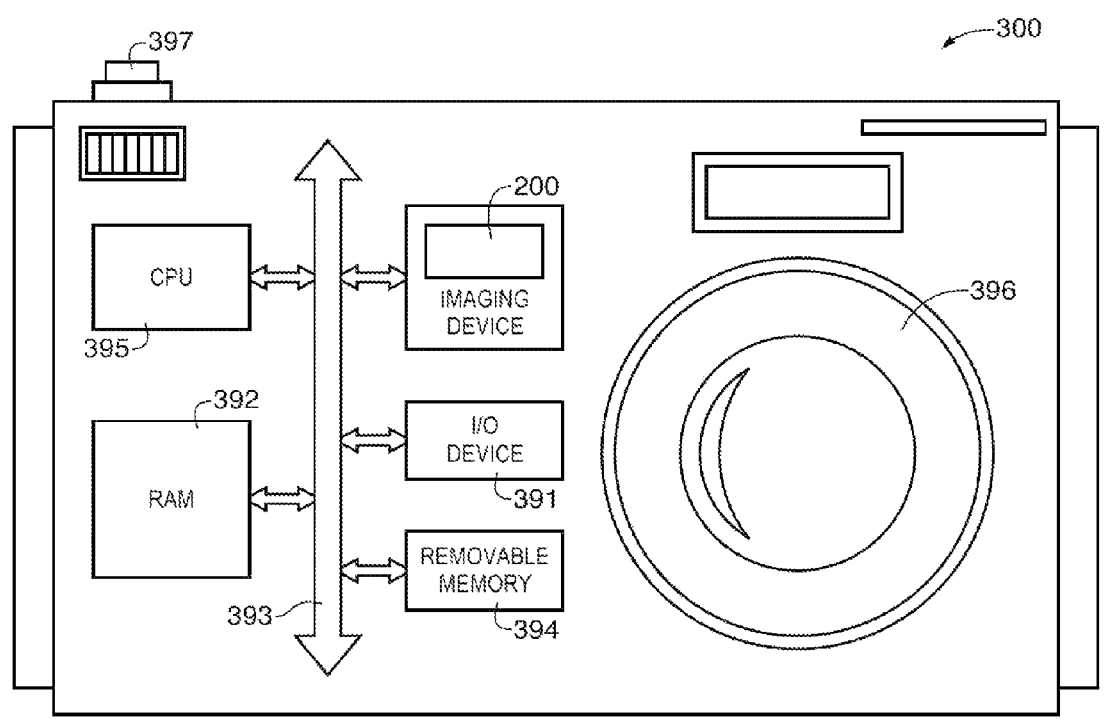
FIG. 6 is a block diagram of a processor system employing the embodiments of FIGS. 1, 2, 4, and/or 5 in accordance with an embodiment of the present invention.

At step 100, image sensor 16 may capture image signals from a scene. The image signals captured by image sensor 16 may include yellow image signals generated in response to, for example, green and red light gathered with the modified clear (Y) image pixels. If desired, the image signals may also include one or more of red image signals, blue image signals, or green image signals depending on the configuration of image pixels in image pixel array 200. In the example of FIG. 6, red (R'), yellow (Y'), and blue (B') image signals may be generated by respective red, modified clear, and blue pixels.

At step 102, a white balance operation may be performed on the captured image signals. In the example of FIG. 6, a white-balanced red image signal (R"), white-balanced yellow image signal (Y"), and white-balanced blue image signal (B") may be produced.

At step 104, processing circuitry 18 may demosaic and apply a chroma filter to the white-balanced image signals to extract red image data (R image data), yellow image data (Y image data), and blue image data (B image data) from the white-balanced image signals. The chroma filter may be applied to chroma de-noise the white-balanced image signals. Processing circuitry 18 may, for example, demosaic the image signals and apply the chroma filter simultaneously, sequentially, or in an interspersed manner. The process of applying a chroma filter and demosaicing the image signals may sometimes be referred to herein as "chroma demosaicing." The chroma filter may increase noise correlation between image data of each color (e.g., noise fluctuations in the red, yellow, and blue channels may increase or decrease together in a correlated manner). For example, processing circuitry 18 may increase the correlated noise between the red, yellow, and green image data to as much as 70% or more of all noise associated with the red, yellow, and green image data.

By increasing noise correlation, processing circuitry 18 may reduce the amount of noise amplification generated when a CCM is applied to the image data in addition to the noise reduction achieved using the yellow (for example) pigment in the modified clear color filter. Chroma demosaicing the image signals may allow missing color image data (e.g., image signals of colors not generated by the image pixels) to be generated from available color image signals. In this example, green image signals may be missing from the gathered image signals because no green color filter is used in unit cell 192 (FIG. 4). Green image data may be determined using the yellow, red, and blue image signals (e.g., by performing subtraction operations). In general, any of the primary additive colors (e.g., red, green, and blue) may be determined using the available color image signals. It may be desirable to produce red, green, and blue image data regardless of the color filters used on image pixel array 200 because display systems often display images using red, green, and blue pixels.

At step 106, processing circuitry 18 may apply a color correction matrix (CCM) to the red image data, yellow image data, and blue image data. The CCM may, for example, extract green image data from the yellow image data to generate red, green, and blue image data. For example, the CCM may convert the image data into standard red, standard green, and standard blue image data (sometimes referred to collectively as linear sRGB image data or simply sRGB image data). In another suitable arrangement, the CCM may extract green image data from the red and/or blue image data. If desired, gamma correction operations may also be performed on the linear sRGB image data. After gamma correction operations, the sRGB image data may be used for display using an image display device. In some cases, it may be desirable to provide additional noise reduction (e.g., by applying a point filter to the sRGB image data) to further mitigate the noise amplification generated by applying the CCM to the red, yellow, and blue image data. Processing circuitry 18 may preserve the yellow image data for further processing of the sRGB image data during optional step 108.

At optional step 108, processing circuitry 18 may apply a point filter to the image data (e.g., to the sRGB image data produced after applying the CCM to the red, yellow, and blue image data). The point filter may operate on the sRGB image data to generate corrected sRGB data. The point filter may serve to further reduce noise amplification caused by applying the CCM to the red, yellow, and blue image data. When displayed using a display system, the corrected sRGB data thereby provide better image quality (e.g., better luminance performance) when compared to the sRGB data prior to applying the point filter.

Chroma demosaicing image signals received from image pixel array 200 may include demosaicing yellow image signals to produce yellow image data (e.g., a yellow pixel value for each modified clear image pixel). The yellow pixel values may be used to compute difference values using the red and blue image signals to increase noise correlation between the red, yellow, and blue image signals. Chroma demosaicing image signals may also include generating red difference values by subtracting yellow pixel values from red pixel values for each red image pixel, generate blue difference values by subtracting the yellow pixel values from blue pixel values for each blue image pixel, and filtering the red difference values and the blue difference values using a chroma filter.

The chroma filter may be applied to the red and blue difference values by, for example, performing a weighted average of difference values computed over a kernel of image pixels 190. Demosaicing and filtering image signals may also include adding the yellow pixel values to chroma filtered red difference values and chroma filtered blue difference values to generate chroma filtered red pixel values and chroma filtered blue pixel values, respectively. Demosaicing and filtering image signals may also include demosaicing the chroma filtered red pixel values and the chroma filtered blue pixel values to produce red image data and blue image data with increased correlated noise.

Applying the CCM to the image data may then include applying the CCM to the demosaiced yellow pixel data and the chroma demosaiced red and blue pixel data to generate standard red, standard green, and standard blue (sRGB) image data.

Applying a point filter to the linear sRGB data to produce corrected sRGB data using the white image data may include operations on signals from a single image pixel 190 without information from adjacent image pixels 190, whereas chroma demosaicing may require image signals (e.g., difference values) from multiple image pixels (e.g., a kernel of image pixels) when being applied to image signals at a single image pixel 190.

Applying the point filter may include using the red image data, yellow image data, and blue image data (e.g., the image data prior to applying the CCM) to compute an original (raw) luminance signal. The original luminance signal may be a linear combination (e.g., a weighted sum) of the yellow image data, red image data, and blue image data. If desired, the yellow image data may be weighted more heavily than the red and blue image data in the linear combination.

Applying the point filter may include generating an implied luminance value (e.g., a luminance value in LCH space) for a given image pixel 190 by combining the red, green, blue image data (e.g., after applying a CCM) and generating a scaling value by dividing the yellow pixel values by the implied luminance value. If desired, the scaling factor may be generated by dividing the yellow pixel values by a weighted sum of the implied luminance value and the yellow pixel value. The scaling factor may include adjustable weighting parameters that can be varied to adjust the strength of the point filter (e.g., the weighting parameters may be varied continuously to adjust the strength of the point filter from zero to a full strength). The scaling value may, for example, be an operator that operates on the sRGB data.

Applying the point filter may also include multiplying the sRGB data by the scaling value to produce corrected sRGB data (e.g., corrected standard red, green, and blue image data). For example, processing circuitry 18 may multiply the standard red image data by the scaling value, the standard green image data by the scaling value, etc. The corrected sRGB data may, if desired, be provided to a display.

FIG. 6 shows in simplified form a typical processor system 300, such as a digital camera, which includes an imaging device 2000 (e.g., an imaging device 2000 having an image pixel array 200 with modified clear pixels as well as circuitry for performing the operations described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 200 of device 2000 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating image sensors having modified clear image pixels with modified clear filter elements. The modified clear color filter element may be formed from a transparent material such as an oxide material that is modified with a colored pigment or colored dye such as yellow pigment. The modified clear image pixels may be formed in repeating unit pixel cells in an image pixel array. Each unit pixel cell may include one or more modified clear pixels and one or more color pixels of other colors such as red pixels, blue pixels, and green pixels.

Image signals such as yellow image signals from the modified clear pixels may be processed along with other color image signals such as red image signals, blue image signals, and green image signals to generate standard red, green, and blue image data. Image processing operations may include chroma demosaicing and/or point filtering of the image signals.

The foregoing is merely illustrative of the principles of this invention which can be practiced in other embodiments.

What is claimed is:
1. An image sensor, comprising:
a plurality of red image sensor pixels each having a red color filter element;
a plurality of blue image sensor pixels each having a blue color filter element; and
a plurality of modified clear image pixels each having a modified clear color filter element that includes a mixture of transparent material and color pigment material, wherein the plurality of red image sensor pixels, the plurality of blue image sensor pixels, and the plurality of modified clear image pixels are arranged in a pattern of repeating two-pixel by two-pixel unit cells across an image sensor pixel array, and wherein each of the two-pixel by two-pixel unit cells comprises a corresponding pair of the modified clear image pixels.

2. The image sensor defined in claim 1 wherein the color pigment material comprises yellow color pigment material.

3. The image sensor defined in claim 2 wherein the mixture of transparent material and color pigment material comprises at least 20 percent color pigment material.

4. The image sensor defined in claim 3 wherein each modified clear color filter element passes green light and red light and blocks blue light.

5. The image sensor defined in claim 3 wherein each modified clear color filter element transmits more than 30 percent of light having wavelengths between 485 nm and 800 nm while transmitting less than thirty percent of light having other wavelengths.

6. The image sensor defined in claim 3 wherein each modified clear color filter element transmits more than 30 percent of light having wavelengths between 475 nm and 800 nm while transmitting less than thirty percent of light having other wavelengths.

7. The image sensor defined in claim 3 wherein each modified clear color filter element transmits more than 30 percent of light having wavelengths between 450 nm and 800 nm while transmitting less than thirty percent of light having other wavelengths.

8. The image sensor defined in claim 3, further comprising: circuitry configured to process image signals from the plurality of red image sensor pixels, the plurality of blue image sensor pixels, and the plurality of modified clear image sensor pixels to form standard red, green, and blue image data.

9. The image sensor defined in claim 8 wherein the circuitry is configured to perform at least one of chroma demosaicing and point filtering operations on the image signals from the plurality of red image sensor pixels, the plurality of blue image sensor pixels, and the plurality of modified clear image sensor pixels.

10. The image sensor defined in claim 1 wherein each of the two-pixel by two-pixel unit cells comprises one red image pixel.

11. The image sensor defined in claim 10 wherein each of the two-pixel by two-pixel unit cells comprises one blue image pixel.

12. The image sensor defined in claim 1 wherein each of the two-pixel by two-pixel unit cells comprises on blue image pixel.

13. A system, comprising:
a central processing unit;
memory;
a lens;
input-output circuitry; and
an imaging device, wherein the imaging device comprises:
an image sensor having an array of image pixels, wherein the array of image pixels includes red image pixels, blue image pixels, and modified clear image pixels, wherein the modified clear image pixels each include a color filter element that includes transparent material and yellow color pigment; and
processing circuitry configured to perform chroma demosaicing operations on image data generated using the modified clear image pixels that increase noise correlations between image data generated using the red image pixels, image data generated using the blue image pixels, and the image data generated using the modified clear image pixels.

14. The system defined in claim 13 wherein the processing circuitry is further configured to perform point filter operations on the image data generated using the modified clear image pixels.

15. The system defined in claim 13, further comprising: processing circuitry configured to perform point filter operations on image data generated using the modified clear image pixels.

16. The system defined in claim 13, wherein the processing circuitry is configured to perform the chroma demosaicking operations on the image data generated using the modified clear image pixels by increasing the noise correlations to at least 70 percent of all noise associated with the image data generated by the red, blue, and modified clear image pixels.

17. A system, comprising:
a central processing unit;
memory;
a lens;
input-output circuitry; and
an imaging device, wherein the imaging device comprises:
an image sensor having an array of image pixels, wherein the array of image pixels includes red image pixels, blue image pixels, and modified clear image pixels, wherein the modified clear image pixels each include a color filter element that includes a mixture of transparent material and yellow color pigment, and wherein the transparent material comprises an oxide material.

* * * * *